Oct. 5, 1965   C. F. BOESTER   3,210,053
AERATOR STRUCTURE
Filed Aug. 4, 1964   2 Sheets-Sheet 1
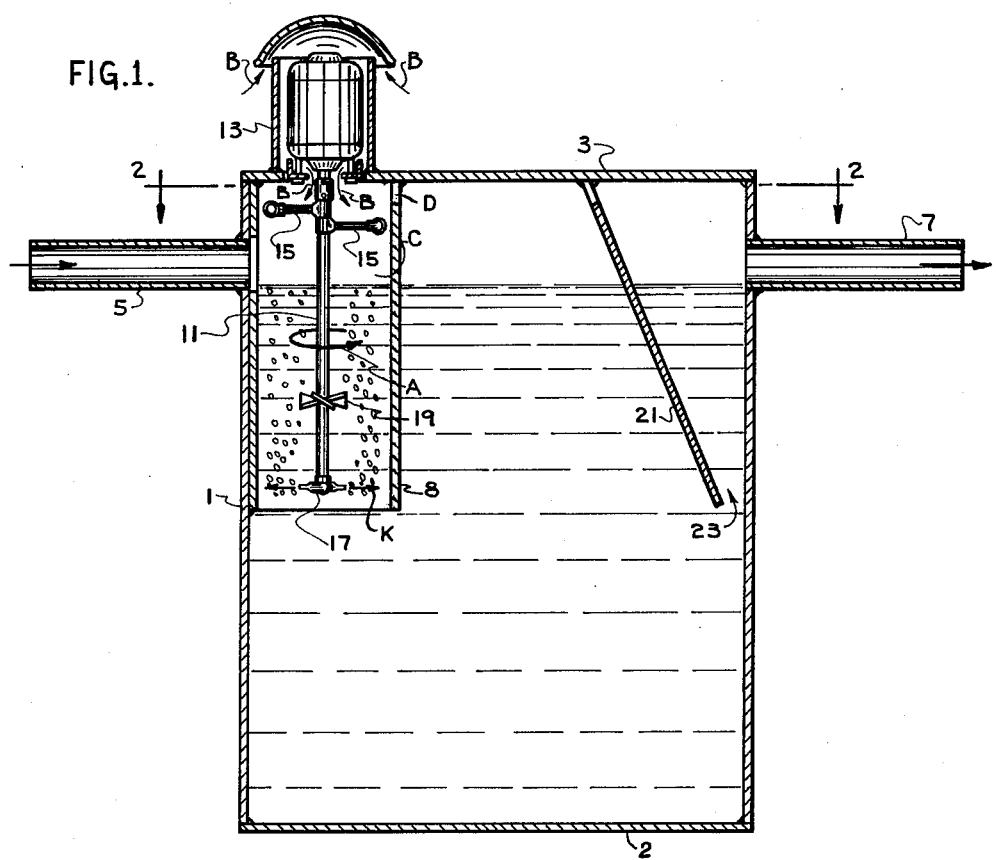
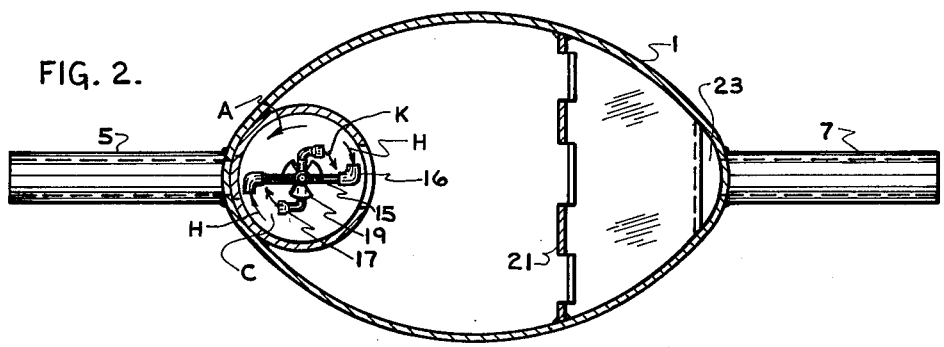
INVENTOR.
Carl F. Boester
BY Rodney Bedell
Atty.

Oct. 5, 1965 C. F. BOESTER 3,210,053
AERATOR STRUCTURE
Filed Aug. 4, 1964 2 Sheets-Sheet 2

INVENTOR.
Carl F. Boester
BY Rodney Bedell
atty.

United States Patent Office 3,210,053
Patented Oct. 5, 1965

3,210,053
AERATOR STRUCTURE
Carl F. Boester, Arlington, Va.
(P.O. Box 567, Lafayette, Ind.)
Filed Aug. 4, 1964, Ser. No. 387,820
5 Claims. (Cl. 261—6)

This is a continuation-in-part of application Serial No. 40,722, filed July 5, 1960, and now forfeited.

The invention relates to the thorough aeration of liquid within a compartment, combined with a simultaneous treatment of the liquid in a substantially quiescent state, although it is contemplated that the liquid may flow continuously through the compartment from a source of supply to an outlet.

Among the objects of the invention are to effect thorough and efficient aeration of liquid in a compartment without requiring an air compressor; to avoid uneven distribution of air to the liquid; to effect a circular discharge of air to the liquid while avoiding vortexing effects, and to form a unit for effecting the above which is readily inserted within a larger tank in which the liquid will flow free of restricted currents to an outlet and be subject to bacterial treatment during such flow.

In the accompanying drawings the invention is illustrated as embodied in a household sewage disposal system which may be used in place of the usual installation involving connection with sewer or septic tank.

FIG. 1 is a vertical section through a tank in one part of which is a relatively smaller liquid receiving and aerating compartment.

FIG. 2 is a horizontal section approximately on line 2—2 of FIG. 1.

Figure 3:
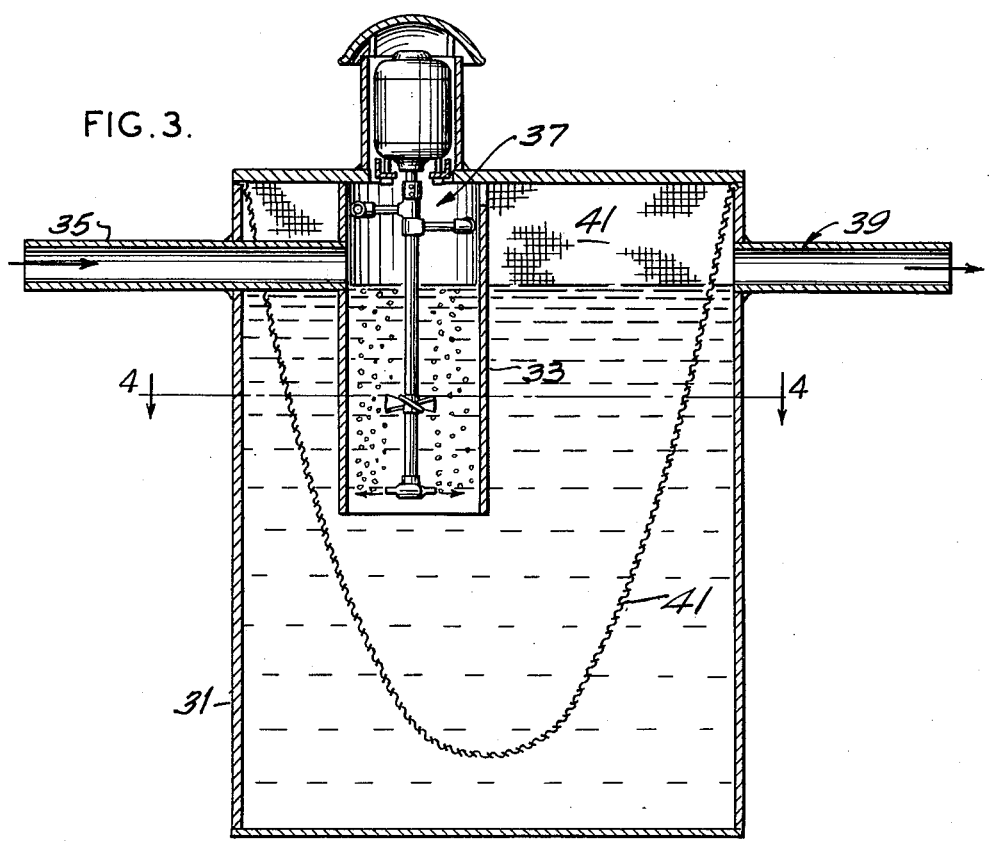
FIG. 3 is a section similar to FIG. 1 but illustrating another form of the invention.

Tank 1 is of obround cross section and of sufficient volume to contain the normal discharge of waste fluid from a household of several persons. For illustration, a tank of three hundred to five hundred gallons capacity would meet most requirements. This would involve a tank about 30" wide, 48" long and 60" to 80" high. The tank has a bottom wall 2 and a top wall 3.

At one side of the tank is an inlet pipe 5 and at the opposite side of the tank is an outlet pipe 7. Both of these pipes are below the level of tank top wall 3. At the side of the tank adjacent pipe 5, and receiving liquid admitted through pipe 5, is a relatively small compartment C formed by an upright cylindrical casing 8, the upper end of which is above the level of inlet pipe 5 but communicates at D with the upper interior of tank 1. The lower end of casing 8 is open to tank 1 substantially below the level of inlet pipe 5 but is well above the bottom of tank 1.

An air collector and distributor discharging into the lower portion of compartment C comprises a hollow upright shaft 11, driven by a motor 13, and mounted on the upper end of the casing or the top wall of the tank. Hollow arms 15 extend radially from the upper part of the shaft and above the level of liquid in the tank and the compartment and the inlet to the latter and open into the interior of the shaft. Arms 15 have terminals facing in a direction extending in the direction of rotation of the shaft and arms as indicated by arrow A. The terminals are flared to form air scoops 16. Hollow arms 17 extend radially from the lower portion of shaft 11 and are connected thereto and have flattened discharge terminals facing in a direction opposite to the direction faced by the terminals of arms 15.

Rotation of shaft 11 in the direction of arrow A at a suggested speed of 1800 r.p.m. causes a flow of air as indicated by arrows H from the exterior of the structure through arms 15, shaft 11 and arms 17 to the inner lower portion of compartment C. Also air is entrained by liquid flow through pipe 5 into the compartment. The air entering the compartment will not be discharged by the liquid into the major portion of the tank below the lower end of compartment C but will bubble up through the liquid in the compartment.

Radial blades 19 are secured to shaft 11 substantially above the level of nozzle 17 and present upwardly and rearwardly inclined upper faces to the liquid as the shaft is rotated. These blades overcome the vortex action resulting from the discharge of air from the nozzles and contribute to spinning the liquid and any solids therein about the shaft in a direction opposite to the direction of air discharged from nozzle 17. Blades 19 also break up any solids in the compartment and facilitate their dispersion and oxidation if they are oxidizable.

Obviously there will be substantial agitation and turbulence in compartment C but there will be no corresponding turbulence in the remainder of the tank. Preferably a baffle 21 extends from side to side of the upper portion of the tank in front of but spaced from outlet 7. The baffle is shown inclined downwardly toward the end of the tank remote from compartment C and terminates before meeting the end wall of the tank so as to leave a restricted passage 23. This avoids a direct current across the tank from inlet 5 to outlet 7 and further tends to maintain the liquid in the tank quiescent and liquid is only admitted from the lower portion of the tank through passage 23 to outlet 7. The area between baffle 21 and the adjacent end wall of the tank may be considered a settling compartment for any solid, such as ash, not oxidized by the actions in compartment C and the major portion of tank 1.

Incoming liquid flowing through pipe 5 into compartment C merges with the fluid moving upwardly and circularly in the compartment while a corresponding quantity of liquid is displaced from the lower portion of the compartment downwardly through the open lower end of casing 8, moving evenly and slowly into the larger quantity of fluid in the main tank and a similar quantity of liquid rises upwardly through passage 23 and passes through outlet 7. This movement does not create turbulence or restricted currents in the main body of liquid. When the liquid level throughout the tank, including compartment C and the discharge area adjacent outlet 7, falls to the level of the bottom of inlet 5 and outlet 7 there is no flow from compartment C to the main body of the tank or from the latter to outlet 7. Portions of the fluid in compartment C continue to rotate about shaft 11 and to flow upwardly under the impulse of blades 19 and the air bubbles. This causes fluid in the upper portion of compartment C to move downwardly and be thoroughly aerated but not impelled into the body of fluid in the main tank until additional fluid is received through pipe 5.

With the structure described there is a thorough aerating operation in compartment C achieving dissolved oxygen in the sewage liquid to permit continuous aerobic treatment of the waste material therein while the substantially quiescent liquid in the major portion of the tank may serve for anaerobic treatment of any waste material passing from compartment C. This combination of aerobic and anaerobic treatment results in converting sewage solids to an inoffensive gas and liquid and their safe and automatic discharge to open ground and air or to a submerged drain.

Figure 4:
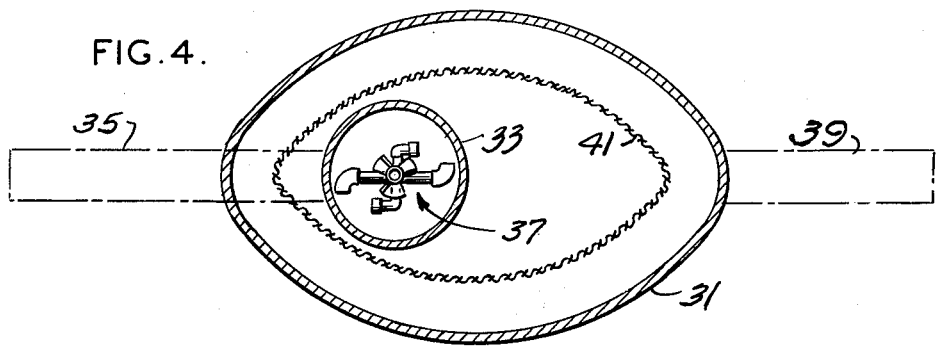
FIG. 4 is a horizontal section on line 4—4 of FIG. 3.

FIGS. 3 and 4 show a tank 31, a relatively smaller compartment 33, an inlet conduit 35 leading from the exterior of the tank to the upper part of compartment 33, an aerating and agitating device 37 and an outlet pipe 39, all corresponding in structure and operation to like parts shown in FIGS. 1, 2 except that compartment 33 is spaced from the side of the tank.

Loosely surrounding compartment 33 and in spaced relation to the compartment and tank walls is a bag-like filter member 41 of woven fabric or other textile, plastic or other suitable material, whereby liquid moving from the lower end of compartment 33 will spread over a large area before passing through the bag-like filter and merging with the body of relatively quiescent liquid in the tank between the filter and the tank wall. This will afford ample opportunity for anaerobic bacterial action on all of the liquid waste material entering the apparatus settling to the bottom of the tank, and for want of oxygen, there aerobically gasifying, becoming buoyant and rising to the surface where it is exposed to the air and further aerobic action before liquid at the upper level is discharged through outlet pipe 39 for overflow or for recirculation as flushing fluid. This leaves a minute quantity of inert solid matter deposited in the tank.

This form of the invention should not require a baffle, such as is shown at 21 in FIGS. 1, 2, but if volume of contents or speed of operation would make such a baffle advantageous it could be provided immediately in front of the outlet.

The aerating device illustrated is suitable for the specific purposes described and also for use in other fields, and the exclusive use of the structure and modifications thereof, as specified in the claims, is contemplated.

What is claimed is:

1. In a structure for combining aerobic and anaerobic bacterial treatment of waste liquid, a tank of sufficient volume to contain substantial discharge of waste fluid from a household, means forming a relatively small vertically elongated compartment secured inwardly of the tank and having an open lower end spaced substantially above the bottom of the tank and having an apertured upper end near but below the top of the tank, means to supply waste liquid from the exterior of the tank into said compartment at a level near but spaced below the upper end of the latter, an upright, hollow shaft extending from above the level of said inlet pipe downwardly into the compartment substantially throughout the length thereof and spaced from the sides thereof.

means for rotating the shaft in one direction, an upper, hollow, air inlet arm connected to the interior of said shaft and radiating therefrom above the level of said liquid inlet pipe and having an open outer end forming an air scoop facing in the direction of rotation of the shaft, a lower, hollow, air discharge arm connected to the interior of said shaft and radiating therefrom adjacent to and above the lower end of said compartment and having an open outer end forming an air discharge terminal facing in the direction opposite to the direction of rotation of said shaft by said means, an outlet pipe leading from the interior of the tank at a level substantially the same as said inlet pipe and well above the level of the lower end of said compartment, said outlet pipe being normally open at both ends, and constituting substantially the sole outlet for liquid from the tank, baffle plate means extending from side to side of the interior of the tank in front of but spaced from the open inner end of said outlet pipe, and from above the level of the liquid to a point spaced substantially above the bottom of the tank and spaced from, but adjacent to, the side of the tank directly below said outlet pipe to prevent flow of liquid at the level of the liquid in the tank from the bottom of said compartment directly to said outlet pipe, said outlet pipe being spaced transversely of the tank from said compartment, whereby a liquid level may be maintained in said tank and the compartment substantially above the level of the bottom of said compartment and waste liquid entering said compartment through said supply means is first subjected to turbulence and aeration in said compartment and then as the liquid level in the tank reaches the level of said outlet pipe and liquid flows therethrough to the exterior of the tank, liquid in said compartment moves downwardly through the open lower end thereof into a comparatively quiescent large pool formed by liquid in the remainder of the tank.

2. A structure according to claim 1 in which the shaft rotating in the relatively small compartment is provided with blades fixed thereon and projecting radially from the shaft exterior below the level of said inlet pipe and above the level of said lower arm and each inclined transversely of its length in an upward direction from its leading edge rearwardly to impel liquid with entrained and discharged air adjacent the shaft upwardly in said compartment as the shaft and blades rotate.

3. Apparatus for combining aerobic and anaerobic bacterial treatment of waste liquid comprising a tank of sufficient volume to contain substantial discharge of waste fluid from a household and having a closed bottom, means forming a relatively small vertically elongated compartment secured inwardly of the tank and having an open lower end spaced substantially above the bottom of the tank and having an apertured upper end near but below the top of the tank, an inlet pipe to supply waste liquid from the exterior of the tank into said compartment at a level near but spaced below the upper end of the latter, means for supplying air throughout the waste liquid within said compartment and for agitating the liquid within said compartment independently of the liquid in the tank outside of said compartment, an outlet pipe having an open inner end and an open outer end and leading from the interior of the tank at a level substantially the same as said inlet pipe and spaced substantially above the level of the lower end of said compartment, said outlet pipe being spaced transversely of the tank from said compartment, means between the lower open end of said compartment and said inner open end of said outlet pipe impeding the flow of liquid in a direct path from said compartment to said outlet pipe and preventing turbulence in the flow of liquid in the tank, all of the described structure maintaining a substantially quiescent body of liquid except in said relatively small compartment, whereby waste liquid entering said compartment through said supply means is first subjected to turbulence and aeration in said compartment and then as the liquid level in the tank reaches the level of said outlet pipe, and liquid flows therethrough to the exterior of the tank, liquid in said compartment moves downwardly through the open lower end thereof into a comparatively quiescent large pool formed by liquid in the remainder of the tank and is subject to substantial exposure to an aerobic bacterial action before moving into said outlet pipe.

4. Apparatus according to claim 3 in which the means impeding the flow of liquid in a direct path from the small compartment to the outlet device includes a bag-like member of filter material surrounding but spaced from the compartment and also spaced from the side and lower end of the tank and receiving and temporarily restraining the liquid flowing from said compartment to the outlet pipe.

5. Apparatus for treating waste liquid aerobically and anaerobically comprising a tank having a closed bottom and upright sides, a smaller compartment within the tank having upright sides spaced from upright sides of the tank and having an open lower end spaced substantially above the bottom of the tank, an inlet conduit leading from the exterior of the tank to the interior of the compartment, an outlet pipe leading from the upper portion of the tank, means for agitating and aerating the contents of the compartment before they pass from the compartment through the open lower end thereof, and a bag-like member of filter material suspended from the upper portion of the tank and surrounding said compartment and spaced from the side and bottom of the tank and receiving the discharge from the compartment and forming a flow-impeding screen between the compartment and said outlet pipe to prevent turbulence in the flow of liquid in the tank.

References Cited by the Examiner

UNITED STATES PATENTS

| | | | |
|---|---|---|---|
| 642,460 | 1/00 | Kersten | 210—220 X |
| 2,413,838 | 1/47 | Mallory | 210—199 |
| 2,628,447 | 2/53 | Brown | 43—57 |
| 2,830,947 | 4/58 | Griffith | 210—17 |
| 2,928,661 | 3/60 | MacLaren | 261—93 X |
| 2,970,401 | 2/61 | Hays | 43—57 |
| 3,051,315 | 8/62 | Boester | 210—220 X |

FOREIGN PATENTS

| | | |
|---|---|---|
| 87,855 | 9/59 | Denmark. |
| 501,334 | 2/39 | Great Britain. |

HARRY B. THORNTON, *Primary Examiner.*

RONALD R. WEAVER, *Examiner.*